United States Patent [19]
Schremmer et al.

[11] Patent Number: 5,672,111
[45] Date of Patent: Sep. 30, 1997

[54] MOTOR VEHICLE STEERING SPINDLE WITH PLUG-IN CONNECTION

[75] Inventors: Gottfried Schremmer, Tamm; Klaus Brandes, Asendorf/Nordheide; Hanno Lox, Elmshorn; Ruediger Unfug, Halstenbek; Uwe Affolderbach, Hanstedt/Nordheide; Joachim Kieserling, Kernen i.R., all of Germany

[73] Assignee: Mercedes-Benz AG, Germany

[21] Appl. No.: 301,110

[22] Filed: Sep. 6, 1994

[30] Foreign Application Priority Data

Sep. 3, 1993 [DE] Germany .............. 43 29 735.8

[51] Int. Cl.⁶ ................................................ F16D 3/64
[52] U.S. Cl. ...................... 464/75; 403/359; 464/180
[58] Field of Search ............................ 464/75, 162, 74, 464/180; 403/359

[56] References Cited

U.S. PATENT DOCUMENTS

| 2,272,900 | 2/1942 | Saurer. | |
|---|---|---|---|
| 3,197,216 | 7/1965 | Jackson | 464/75 X |
| 3,367,142 | 2/1968 | Groves et al. | 464/162 |
| 4,552,544 | 11/1985 | Beckman et al. | 464/162 |
| 5,042,153 | 8/1991 | Imao et al. . | |

FOREIGN PATENT DOCUMENTS

| 1 072 890 | 1/1960 | Germany . | |
|---|---|---|---|
| 38 22 637 A1 | 1/1990 | Germany . | |
| 62-009027 | 6/1987 | Japan . | |
| 2-286468 | 4/1989 | Japan . | |
| 2256027 | 11/1992 | United Kingdom | 403/359 |

OTHER PUBLICATIONS

Abstract of Japanese Patent 62-9027.
Abstract of Japanese Patent 53-48944.
Abstract of Japanese Patent 64-39933.
Abstract of Japanese Patent 55-151672.
Abstract of Japanese Patent 54-9339.
Abstract of Japanese Patent 58-50105.
Abstract of Japanse Patent 1-240365.
Abstract of Japanse Patent 2-136371.
English translation of an Office Action in a corresponding foreign application.

*Primary Examiner*—Daniel P. Stodola
*Assistant Examiner*—Emmanuel M. Marcelo
*Attorney, Agent, or Firm*—Evenson, McKeown, Edwards & Lenahan, P.L.L.C.

[57] ABSTRACT

A steering spindle for a motor vehicle has a plug-in connection in which a splined shaft profile extends axially and is arranged at the end of a shaft, and a receiving tube which receives the splined shaft profile and is provided along its inner circumference with a corresponding splined hub profile. Furthermore, the steering spindle has, in the region of the plug-in connection, a plastic layer which extends at least along certain axial regions and fills clearances between the inner wall of the receiving tube and the splined shaft profile. The splines of the one part, arranged in the region of the receiving tube, are formed uninterruptedly in the axial direction and are an undersized portion in the circumferential direction with respect to the grooves of the other part. The splines of the one part are provided with the plastic layer of elastomeric plastic bridging this undersize portion. The plastic layer has an axial portion which is greater than the amount of maximum relative movement between the shaft and the receiving tube.

3 Claims, 4 Drawing Sheets

MOTOR VEHICLE STEERING SPINDLE WITH PLUG-IN CONNECTION

BACKGROUND AND SUMMARY OF THE INVENTION

The present invention relates to a steering spindle for a motor vehicle with a plug-in connection, comprising a shaft having an axially extending splined shaft profile arranged at an end thereof, a receiving tube configured to receive the splined shaft profile and provided along an inner circumference thereof with a corresponding splined hub profile, and a plastic layer, in the region of the plug-in connection to extend axially at least along certain regions and fill clearances between an inner wall of the receiving tube and the splined shaft profile, and also to a manufacturing process therefor.

JP 2-286468 A shows a motor vehicle steering spindle and a process for its production. The steering spindle has a plug-in connection formed substantially by an axially aligned splined shaft profile arranged at the end of the shaft and by a receiving tube receiving the splined shaft profile. The inside diameter of the receiving tube largely corresponds to the outside diameter of the splined shaft profile and forms a splined hub profile. The splined shaft profile is provided with two notchings, the depth of which is greater than the depth of the individual splines forming the splined shaft profile. The receiving tube has openings which lay opposite the notching when the plug-in connection is fitted together. Once the axial position of the splined shaft profile is adjusted with respect to the receiving tube, a resin or a plastic is poured through this opening, fills the notchings and cures therein. After the plastic has set, undergoing volumetric expansion, a radial prestressing of the plug-in spindle is created to eliminate any torsional play. As a result, in particular by the plastic plugs remaining in the openings, which are now monolithically bonded to the set plastic in the notchings, the plug-in connection is fixed in the axial direction. An axial displacement between the shaft and the receiving tube is possible only by the exertion of high forces, such as occur, for example, in the case of an accident in which the plugs have to be sheared off. A relative axial movement between the shaft and the receiving tube or a damping of this movement, or a suppression of vibrations acting on one of the two parts of the plug-in connection, is impossible. However, in the case of steering configurations which execute an axial relative movement with respect to the steering spindle on account of the suspension or for other reasons, the conventional steering spindle is, therefore, unsuitable.

An object of the present invention is to improve a steering spindle such that, with low production costs and with least possible torsional play, the steering spindle permits an axial relative movement between the shaft and the receiving sleeve.

It is a further object of the present invention to improve a production process for such a steering spindle.

The foregoing objects have been achieved according to the present invention by providing a steering spindle in which splines of one of the shaft and the receiving tube, which are formed uninterruptedly in the axial direction in the region of the receiving tube, have an undersize portion in the circumferential direction with respect to the grooves of the other of the shaft and the receiving tube. The splines of the one part are provided with an elastomeric plastic layer bridging the undersize portion. In the case of the improved process, a first, mechanical production step produces the splined shaft profile with an undersize portion with respect to the splined hub profile, the undersize portion being dimensioned to correspond, at most, to a thickness of the subsequently applied plastic layer when in a relaxed state. A second, preferably multipart production step applies a coupling agent layer for the subsequently applied plastic layer to a surface of the splined shaft profile created in the first production step. A third production step uses a mold and applies the elastomeric plastic layer to completely enclose the splined shaft profile along a circumferential direction to obtain a finished splined shaft profile. A fourth step fits the finished splined shaft profile together with the splined hub profile, with a prestressing occurring in a rotational direction, such that the connection therebetween is free from play in the rotational direction but axially movable.

Alternatively, a first, mechanical production step produces the splined shaft profile with an undersize portion with respect to the splined hub profile. The undersize portion is dimensioned to correspond, at most, to a thickness of the plastic layer when in the relaxed state. A second multipart production step applies a coupling agent layer for the subsequently applied plastic layer to a surface of the splined hub profile. A third production step uses a mold and applies the plastic layer to the splined hub profile to create a finished splined hub profile. A fourth step fits the finished splined hub profile together with the splined shaft profile, with a prestressing occurring in a rotational direction, such that the connection is free from play in the rotational direction but axially movable.

Due to the coating of the splines of the splined shaft profile or of the splined hub profile with an elastomeric plastic layer, easy axial displaceability can be combined with good freedom from play in the rotational direction. The elastomeric plastic layer can be applied relatively simply and inexpensively in a dimensionally accurate manner to the splined shaft profile or splined hub profile. Furthermore, the axial linear compensation in the plug-in connection is possible with low force, and the plug-in connection nevertheless is free from play in the rotational direction which is particularly important during normal use of the steering spindle. This type of rotational play elimination is, moreover, significantly more effective and less expensive to produce than a mechanical play setting, for example by way of a receiving tube which is slit and can be reduced in circumference.

BRIEF DESCRIPTION OF THE DRAWINGS

These and further objects, features and advantages of the present invention will become more readily apparent from the following detailed description when taken in conjunction with the accompanying drawings wherein.

DETAILED DESCRIPTION OF THE DRAWINGS

Figure 1:
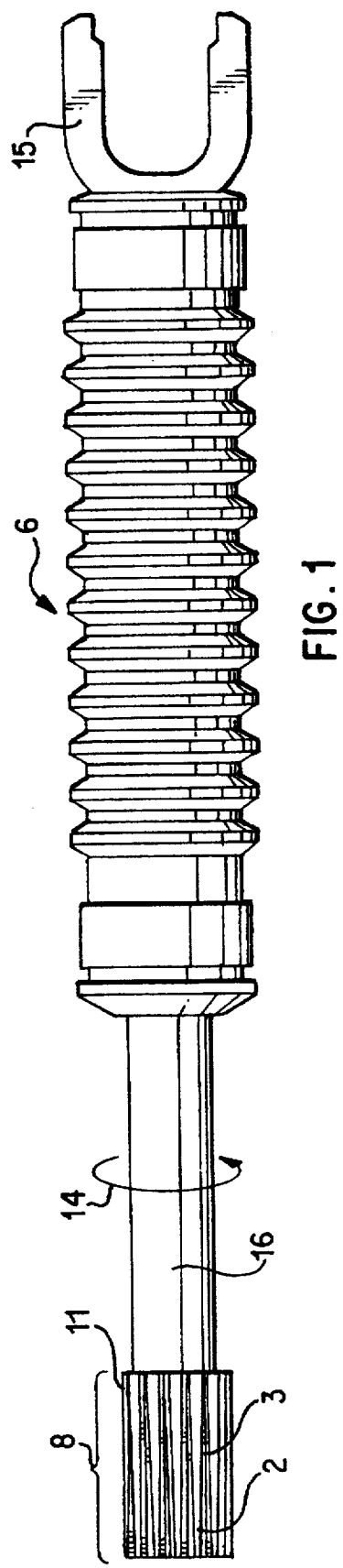
FIG. 1 is an elevational view of a shaft of a steering spindle with an uncoated splined shaft profile.

In FIG. 1, a steel shaft of a motor vehicle steering spindle is designated generally by the numeral 6. The shaft 6 has, at its one end region, a flange 15 for a cardan joint. The other end region of the shaft 6 has a plug-in pin 16 with externally arranged splined shaft profile 8. The splined shaft profile 8 is formed by splines 2 and grooves 3 arranged uniformly on the circumference of the plug-in pin 16 and has a prismatic cross-section.

Figure 2:
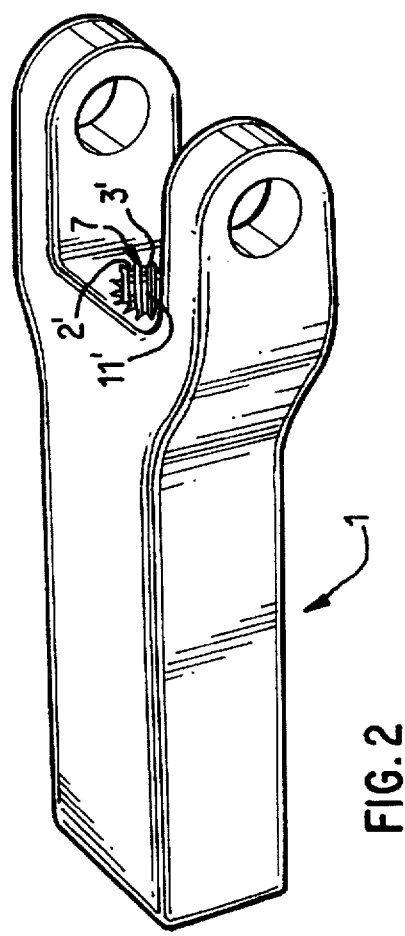
FIG. 2 is a perspective view of a receiving tube of a steering spindle with an uncoated splined hub profile.

A receiving tube 1, which is also made of steel, is shown in FIG. 2 and has on its inner circumference a splined hub profile 7, which corresponds approximately to the splined shaft profile 8. The profile 7 is similarly formed by axially aligned splines 2' of prismatic cross-section and grooves 3' of prismatic cross-section, arranged uniformly on the inner circumference. The splined shaft profile 8 of the shaft 6 forms, together with the splined hub profile 7 of the receiving tube 1, a plug-in connection of the steering spindle, with the splined shaft profile 8 being inserted into the splined hub profile 7.

Figure 3:
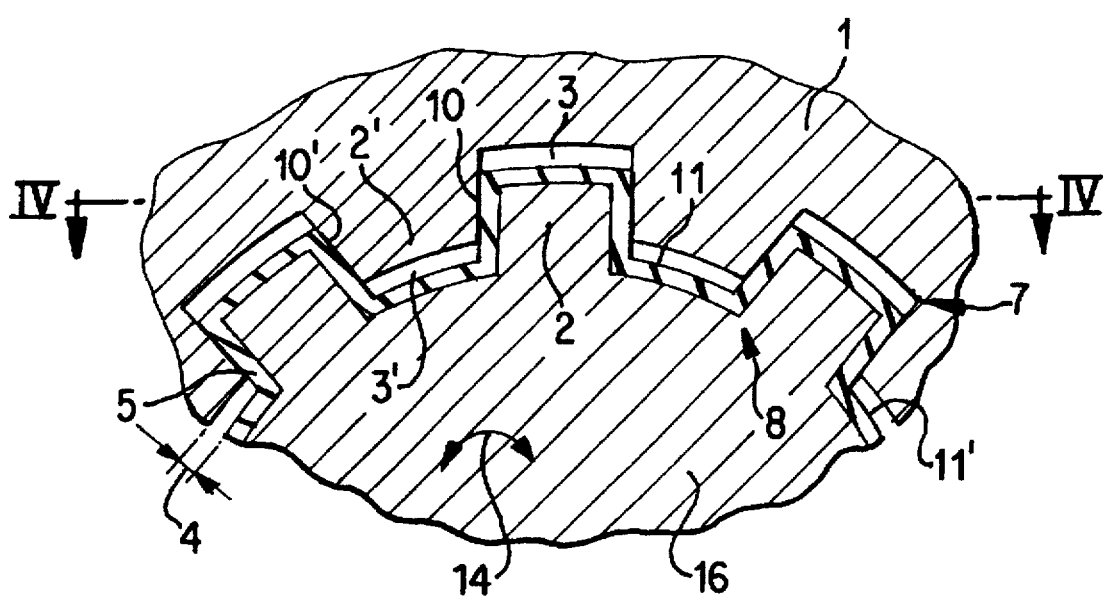
FIG. 3 is a partial cross-sectional view along line III—III of FIG. 4 through a fitted-together steering spindle with coated splined shaft profile in the region of the plug-in connection.
Figure 4:
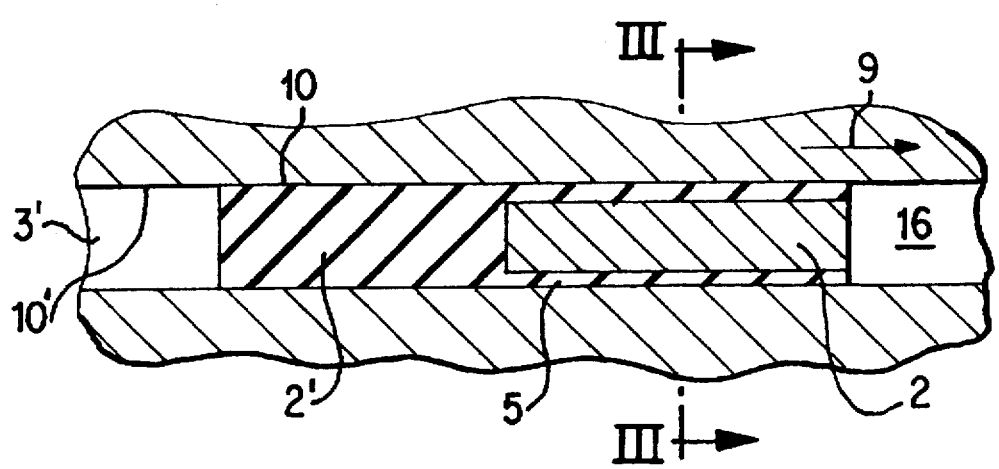
FIG. 4 is a longitudinal sectional view along line IV—IV of FIG. 3, taken parallel to the axis of rotation of the steering spindle, through a spline of the plug-in connection.

As shown in FIGS. 3 and 4, the splines 2 of the splined shaft profile 8 have a prismatic cross-section and, in the region of the receiving tube 1, an undersize portion 4 in the circumferential direction with respect to the grooves 3' of the splined hub profile 7. The grooves 3 of the splined shaft profile 8 have an oversize portion, appropriately corresponding to the amount of the undersize portion 4, with respect to the splines 2' of the splined hub profile 7.

An elastomeric plastic layer 5 is arranged in the clearances formed by the undersize portion 4 or oversize portion. The Shore hardness of the layer 5 is favorably about 60 to 70 degrees. The plastic layer 5 is arranged to bond on the surface 11 of the splined shaft profile 8. The bonding of the plastic layer 5 applied along the circumference of the splined shaft profile 8 with approximately uniform material thickness can occur by adhesion and/or by form closure of the plastic layer 5 with the splined shaft profile 8. The approximately uniform material thickness of the plastic layer 5, at least in the region between the groove flanks 10, 10' and the assigned splines 2, 2', achieves a stressing of all the elements of the plug-in connection identically over the circumference. To achieve a form closure, it is advantageous to provide the surface 11 of the splined shaft profile 8 to be coated with undercuts and/or bores and/or grooves or the like running transversely to the axial direction.

The above-described coating of the splined shaft profile 7 with the plastic layer 5 has the effect of ensuring axial freedom of movement between the shaft 6 and the receiving tube 1, at the same time at least largely preventing the torsional play between the receiving tube 1 and the shaft 6. Furthermore, this arrangement damps axial movement of the two parts with respect to one another, which is favorable in particular in a transfer of vibrations from one part of the plug-in connection to the other part.

In order to obtain damping of the axial movement more simply and conveniently, it is advantageous if the splines 2' and the grooves 3' of the uncoated splined hub profile 7 are likewise formed uninterruptedly.

A further advantageous approach is to form the plastic layer 5 such that, in the relaxed state, it has an oversize portion with respect to the splined hub profile 7 and/or an undersize portion with respect to the splined shaft profile 8. With this configuration of the plastic layer 5, the plug-in connection in the assembled state is prestressed in the radial direction, by virtue of the intrinsic elasticity of the plastic layer 5. Thus, the connection has good damping properties and also further reduced torsional play.

To ensure a reliable plug-in connection, the insertion depth 9 of the splined shaft profile 8 into the splined hub profile 7 must be greater than the amount of maximum likely relative axial movement between the two parts. In the illustrated embodiment FIGS. 3 and 4, the plastic layer 5 appropriately has an axial extent which is greater than this maximum relative movement between shaft 6 and the receiving tube 1 to define a plastic spline.

The insertion of the shaft 6 into the receiving tube 1 can be facilitated by the width of the splines 2 of the splined shaft profile 8, measured in the circumferential direction, increasing in the direction of increasing insertion depth 9, whereas the groove flanks 10, 10' of the splined hub profile 7 are formed parallel to one another in the axial direction. It is furthermore advantageous here that the damping characteristics change with increasing vibration amplitude.

The configuration of the splines 2 of the splined shaft profile 8 is such that the splines 2 coated with the plastic layer 5 consist over part of their axial extent completely of the elastomeric plastic to achieve, in a simple way, weight reduction and a favorable influence on the damping characteristics during vibrations. This advantage can be additionally improved by the circumferential width of a spline 2 of the splined shaft profile 8 which is finished and formed completely of the elastomeric plastic at its end, with respect to the insertion direction, increasing with increasing insertion depth 9, although the assigned groove flanks 10, 10' of the splined hub profile 7 are formed parallel to one another in the axial direction.

As is readily evident, and therefore not need be shown, a reversal of the configuration of the embodiment shown in FIGS. 1 to 4 is likewise within the scope of the present invention in which case, the splined hub profile 7 then has a plastic layer 5 bonded on the surface 11', and the surface 11 of the splined shaft profile 8 remains uncoated.

Figure 5:
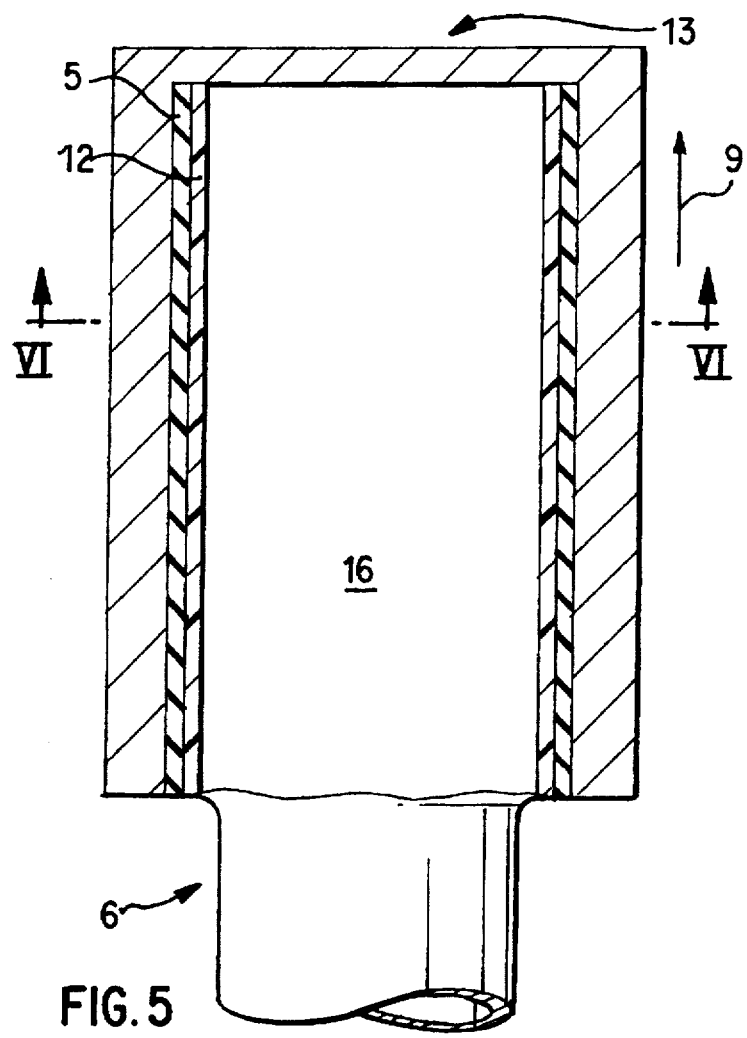
FIG. 5 is a cross-sectional view along line V—V of FIG. 6 through a mold for coating the splined shaft profile with the splined shaft profile inserted into the mold.
Figure 6A:
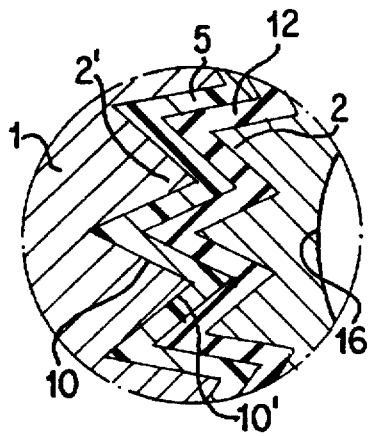
FIG. 6 is a cross-sectional view along line VI—VI of FIG. 5 through the mold with the splined shaft profile inserted into the mold.
Figure 6:
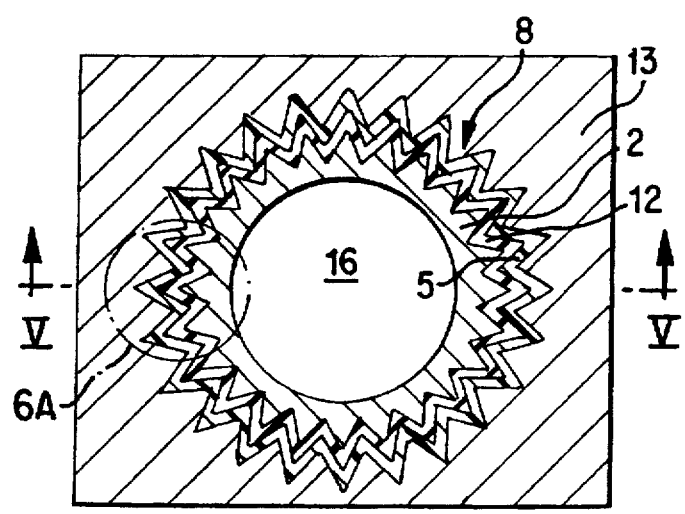

A process for producing a steering spindle is now described, with the coating operation of the splined shaft profile 8 being shown in FIGS. 5 and 6. In a first, mechanical production step, the splined shaft profile 8 is produced with undersize portion 4 with respect to the splined hub profile 7. The undersize portion 4 is dimensioned to correspond, at most, to the thickness of the later-applied elastomeric plastic layer 5 present in the relaxed state. However, it is more favorable to choose the undersize portion to be less than the material thickness of the later-applied plastic layer 5 present in the relaxed state.

In a second, preferably multipart production step, a coupling agent layer 12 for the later-applied elastomeric plastic layer 5 is applied to the surface 11 of the splined shaft profile 8 created in the first production step.

In a third production step, the elastomeric plastic layer 5 is applied to the splined shaft profile 8 using a mold 13. The applied plastic layer 5 completely encloses the splined shaft profile 8 along a circumferential line, whereby the finished splined shaft profile 8, coated with the plastic layer 5, is created.

For coating the splined shaft profile 8, the mold 13 is of a pot-like configuration and has an enclosed casting mold. The physical configuration of the casting mold corresponds largely to that of the splined hub profile 7. The cross-section of the casting mold is greater than the corresponding cross-section of the splined hub profile 8 of the receiving tube 1. To realize the desired material thickness of the coated plastic layer 5, the difference between these two cross-sections is greater than the undersize 4 between the splined shaft profile 8 of the shaft 6 and the splined hub profile 7 of the receiving tube 1. In the production operation of the plastic layer 5, the liquid plastic is filled into the casting mold 13, and subsequently the end region of the shaft 6 which is to be coated and is already provided with the coupling agent layer 12 is introduced in an axially and radially defined position into the casting mold 13. In the casting mold, the liquid plastic sets to form the elastomeric plastic layer 5 and bonds with the surface 11 of the splined shaft profile 8 of the end region concerned. This generally purely adhesive connection can be additionally improved by different form-closure measures, such as undercuts in the end region, roughening of the end region or the like.

Once the plastic 5 has set, the finished splined shaft profile 8, now provided with the plastic layer 5, is drawn out of the mold 13. To facilitate this working step, it is appropriate to provide the surface of the casting mold facing the plastic with a layer which has at most low bonding with the plastic.

Finally, the splined shaft profile 8 provided with the plastic layer 5 is fitted together with the splined hub profile 7, with prestressing in the rotational direction 14 (see the arrow in FIG. 1), such that it is free from rotational play but is axially movable.

For producing the plastic layer 5, it has proven to be advantageous to use a mixture of two components reacting with each other. The components are mixed together immediately before processing to form the readily flowing mixture, and the mixture cures in a curing time of 1 minute to at most 2 minutes into a permanently elastic state with a Shore hardness of about 60 to 70 degrees. The application of the plastic layer 5 or the introduction of the plastic into the casting mold 13 can take place in particular by conventional pressurized injection molding.

Figure 7:
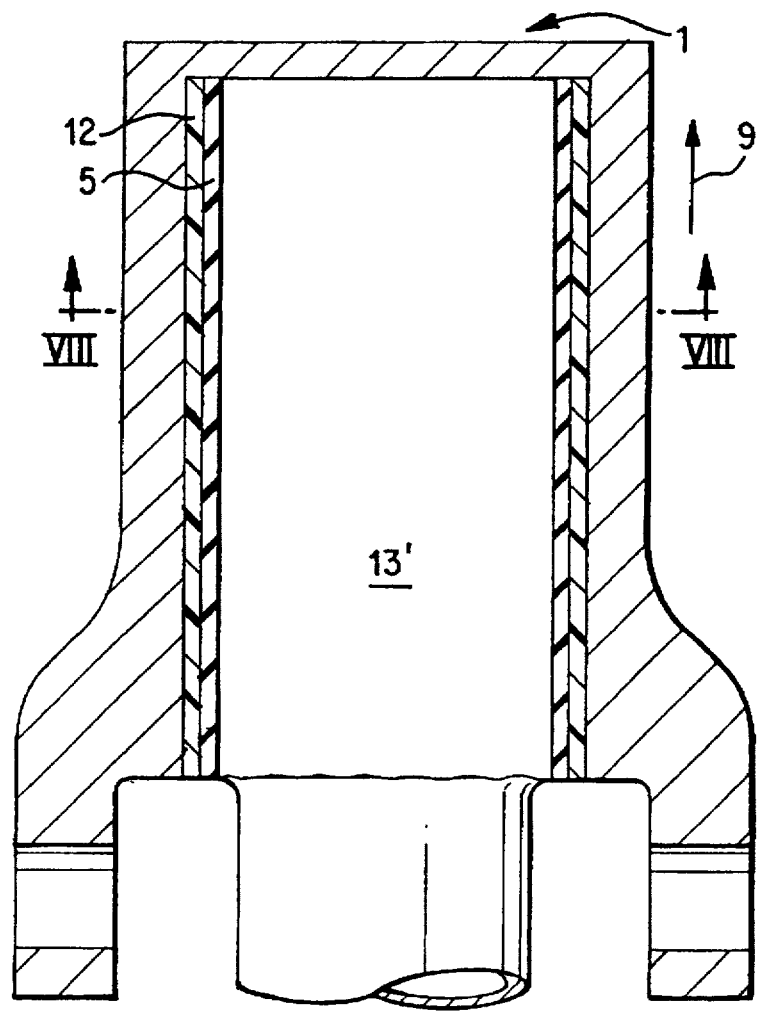
FIG. 7 is a cross-sectional view along line VII—VII of FIG. 8 of a mold inserted into the receiving tube for coating the splined hub profile.
Figure 8A:
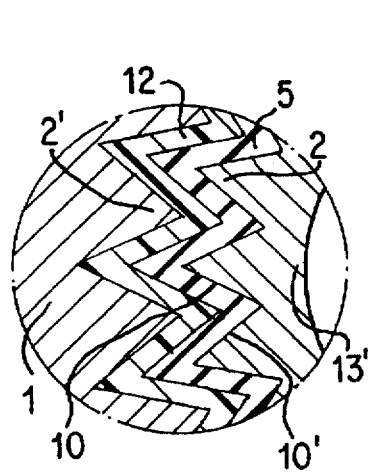
FIG. 8 is a longitudinal sectional view along line VIII—VIII of FIG. 7 of the mold inserted into the receiving tube for coating the splined hub profile.
Figure 8:
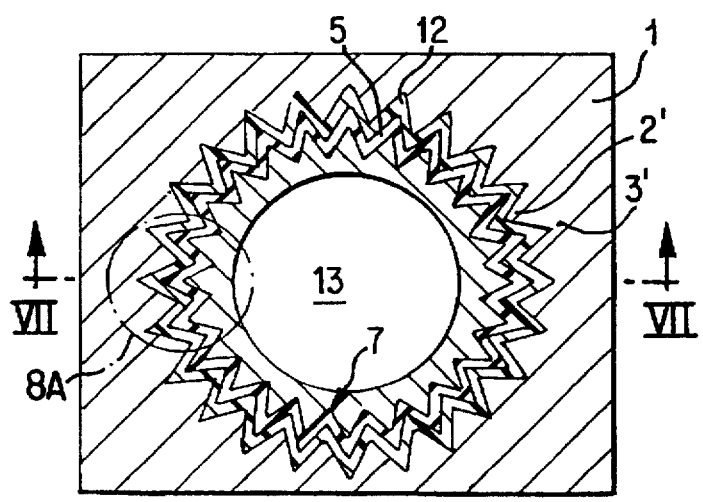

A further process for producing a steering spindle is now described, with the coating operation of the splined hub profile 7 now to be coated with the plastic layer 5 being shown in FIGS. 7 and 8. To avoid unnecessary repetitions, however, only the third working step, concerning the coating of the splined hub profile 7, will be discussed in detail below, because the other process steps are at least similar in comparison with the above described process for producing a steering spindle. For the same reason, the plastic used for coating also need not be discussed in further detail.

In the third production step concerned, the elastomeric plastic layer 5 is applied to the splined hub profile 7 using a mold 13'. The applied plastic layer 5 completely encloses the splined hub profile 7 along a circumferential line, whereby the finished splined hub profile 7, coated with the plastic layer 5, is created.

For coating the splined hub profile 7, the mold 13' is configured in the manner of the splined shaft profile 8. The cross-section of the mold 13' is smaller than the corresponding cross-section of the splined shaft profile 8 of the shaft 6 of the steering spindle. To realize the desired material thickness of the coated plastic layer 5, the difference between these two cross-sections is greater than the undersize portion 4 between the splined shaft profile 8 of the shaft 6 and the splined hub profile 7 of the receiving tube 1.

In the production of the plastic layer 5, first the liquid plastic is filled into the opening of the receiving tube 1, and subsequently the mold 13' is introduced into the receiving tube 1. In the receiving tube 1, the liquid plastic sets to form the elastomeric plastic layer 5 and bonds with the inner surface 11' of the receiving tube 1, that is with the surface 11' of the splined hub profile 7. This generally purely adhesive connection can, as previously discussed, be additionally improved by different form-closure measures, such as undercuts within the receiving tube 1, roughening of the receiving tube 1 or the like. Once the plastic has set, the mold 13' is drawn out of the receiving tube 1. To facilitate this working step, it is appropriate to provide the surface of the mold 13' facing the plastic with a layer which has, at most, low bonding with the plastic.

Finally, the splined shaft profile 8 of the shaft 6 is inserted into the splined hub profile 7, provided with the plastic layer 3, with prestressing in the rotational direction 14, so that it is free from rotational play but axially movable.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. A motor vehicle steering spindle with a plug-in connection, comprising a shaft having an axially extending splined shaft profile arranged at an end thereof, a receiving tube configured to receive the splined shaft profile and provided along an inner circumference thereof with a corresponding splined hub profile, and a plastic layer arranged to extend axially at least along a circumferential region of the splined shaft profile and fill clearances between an inner wall of the receiving tube and the splined shaft profile, splines of one of the shaft and the receiving tube, which are formed uninterruptedly in the axial direction in the region of the receiving tube, having an undersize portion in the circumferential direction with respect to grooves of the other of the shaft and the receiving tube, and the splines of the one being provided with an elastomeric plastic layer bridging the undersize portion, wherein a width of one of the splines of the spliced shaft profile and the splines of the splined hub profile, measured in a circumferential direction, increases in a direction of increasing insertion depth, whereas groove flanks of the other of the profiles are parallel in an axial direction, and the plastic layer extends axially from one end of the splines provided with the plastic layer for a distance larger than a maximum relative movement between the shaft and the receiving tube thereby defining a plastic spline.

2. The spindle according to claim 1, wherein the plastic layer has, in a relaxed state prior to fitting the splined shaft profile and splined hub profile together, one of an oversize portion with respect to the splined hub profile and an undersize portion with respect to the splined shaft profile such that the plastic layer bonded on one of the splined shaft profile and the splined hub profile is prestressingly insertable into the other of the profiles.

3. The spindle according to claim 1, wherein a portion of the splines coated with the plastic layer consists completely of elastomeric plastic.

* * * * *